(12) United States Patent
Oh et al.

(10) Patent No.: US 12,430,200 B2
(45) Date of Patent: Sep. 30, 2025

(54) DEVICE AND METHOD FOR PROGRAM REPAIR FOR TYPE ERRORS IN DYNAMICALLY TYPED LANGUAGE

(71) Applicant: KOREA UNIVERSITY RESEARCH AND BUSINESS FOUNDATION, Seoul (KR)

(72) Inventors: Hakjoo Oh, Seoul (KR); Wonseok Oh, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 18/602,265

(22) Filed: Mar. 12, 2024

(65) Prior Publication Data
US 2024/0320084 A1    Sep. 26, 2024

(30) Foreign Application Priority Data

Mar. 15, 2023  (KR) .................. 10-2023-0033808
Apr. 14, 2023  (KR) .................. 10-2023-0049394

(51) Int. Cl.
*G06F 11/07* (2006.01)
*G06F 11/3604* (2025.01)

(52) U.S. Cl.
CPC ...... *G06F 11/0793* (2013.01); *G06F 11/3604* (2013.01)

(58) Field of Classification Search
CPC .................. G06F 11/0793; G06F 11/3604
See application file for complete search history.

(56) References Cited

U.S. PATENT DOCUMENTS

2017/0017760 A1*  1/2017  Freese ................... G16H 40/63
2020/0097389 A1*  3/2020  Smith ................. G06F 11/0793
(Continued)

FOREIGN PATENT DOCUMENTS

| KR | 10-2209151 B1 | 1/2021 |
| KR | 10-2022-0018391 A | 2/2022 |
| KR | 10-2022-0046467 A | 4/2022 |

OTHER PUBLICATIONS

[Supportive materials for Exception to Loss of Novelty] Wonseok Oh et al., "PyTER: Effective Program Repair for Python Type Errors", ESEC/FSE 2022: Proceedings of the 30th ACM Joint European Software Engineering Conference and Symposium on the Foundations of Software Engineering, Nov. 14, 2022, Singapore, pp. 922-934, https://doi.org/10.1145/3540250.3549130.

(Continued)

*Primary Examiner* — Matthew M Kim
*Assistant Examiner* — Matthew N Putaraksa
(74) *Attorney, Agent, or Firm* — Hauptman Ham, LLP

(57) ABSTRACT

Disclosed is a device and method for automatically repairing type errors occurring in a dynamically typed language. A method of automatically repairing a type error refers to a method of automatically repairing a type error occurring in a dynamically typed language, performed by a computing device including a processor and includes acquiring a buggy program, a testcase, and error information; collecting a candidate variable in which a type error occurs; inferring a negative type that is a type of the candidate variable observed from a negative testcase and a positive type that is a type of the candidate variable observed from a positive testcase; estimating a fault location at which the type error occurs; generating a patch; and generating a fixed program by applying the patch to the buggy program, and the collecting of the candidate variable includes selecting a (Continued)

```
 1 def main(x, y, z) :          1 def main(x, y, z) :
 2   if z :                      2   if z :
       return foo(x, y, z)            return foo(x, y, z)
 4   if y :                      4   if y :
 5     return foo(y, x, z)       5     return foo(y, x, z)
 6   return y                    6   return y
 7                               7
 8 def foo(a, b, c) :            8 def foo(a, b, c) :
 9   d = b + c                   9   d = b + c
10                              10   if isinstance(a, str):
11                              11     a = int(a)
12   e = a + d # TypeError      12   e = a + d # Pass
13   return a + c + e           13   return a + c + e (a) Buggy program                (b) Fixed program
``` variable included in the error information as the candidate variable.

7 Claims, 5 Drawing Sheets

(56) References Cited

U.S. PATENT DOCUMENTS

| | | | |
|---|---|---|---|
| 2023/0153459 A1* | 5/2023 | Sharma | G06F 21/6245 |
| | | | 726/26 |
| 2023/0289253 A1* | 9/2023 | Keshwani | G06F 11/073 |
| 2024/0281316 A1* | 8/2024 | Revanna | G06F 11/0793 |

OTHER PUBLICATIONS

Rollbar, "How to Fix TypeError Exceptions in Python", Oct. 1, 2022, https://rollbar.com/blog/python-typeerror/ (2 pages).

* cited by examiner

FIG. 1

```
1 def main(x, y, z) :           1 def main(x, y, z) :
2   if z :                      2   if z :
      return foo(x, y, z)             return foo(x, y, z)
4   if y :                      4   if y :
5     return foo(y, x, z)       5     return foo(y, x, z)
6   return y                    6   return y
7                               7
8 def foo(a, b, c) :            8 def foo(a, b, c) :
9   d = b + c                   9   d = b + c
10                              10  if isinstance(a, str):
11                              11      a = int(a)
12  e = a + d # TypeError       12  e = a + d # Pass
13  return a + c + e            13  return a + c + e
```

(a) Buggy program              (b) Fixed program

FIG. 2

| Main | Sub | $S_l$(Buggy stmt) | $S_l^{\square}$(Template for $S_l$) | $S_l^*$(Candidate patch) |
|---|---|---|---|---|
| Type Casting | Negative TypeCasting | `return x + y` | `if isinstance(x, `$\square_N$`) :`<br>`    x = `$\square_C$<br>`return x + y` | `if isinstance(x, str) :`<br>`    x = int(x)`<br>`return x + y` |
| | Positive TypeCasting | `return x + y` | `if not isinstance(x, `$\square_P$`) :`<br>`    x = `$\square_C$<br>`return x + y` | `if not isinstance(x, (int)) :`<br>`    x = int(x)`<br>`return x + y` |
| | TypeCasting Expression | `return x + y` | `return `$\square_C$` + y` | `return int(x) + y` |
| Handling | Negative Handling Stmt | `return x + y` | `if isinstance(x, `$\square_N$`) :`<br>`    `$\square_S$<br>`return x + y` | `if isinstance(x, str) :`<br>`    return 0`<br>`return x + y` |
| | Negative Handling Expr | `return x + y` | `return (`$\square_E$` if isinstance(x, `$\square_N$`) else x) + y` | `return (0 if isinstance(x, str) else x) + y` |
| | Positive Handling | `return x + y` | `if not isinstance(x, `$\square_P$`) :`<br>`    `$\square_S$<br>`return x + y` | `if not isinstance(x, (int)) :`<br>`    return 0`<br>`return x + y` |
| | Exception Handling | `return x + y` | `try :`<br>`    return x + y`<br>`except :`<br>`    `$\square_S$ | `try :`<br>`    return x + y`<br>`except :`<br>`    return 0` |
| Guard | Negative Guard | `if x == 0 :`<br>`    return x`<br>`else :`<br>`    return 0` | `if not isinstance(x, `$\square_N$`) and x == 0 :`<br>`    return x`<br>`else :`<br>`    return 0` | `if not isinstance(x, (int)) and x == 0 :`<br>`    return x`<br>`else :`<br>`    return 0` |
| | Positive Guard | `if x == 0 :`<br>`    return x`<br>`else :`<br>`    return 0` | `if isinstance(x, `$\square_P$`) and x == 0 :`<br>`    return x`<br>`else :`<br>`    return 0` | `if isinstance(x, int) and x == 0 :`<br>`    return x`<br>`else :`<br>`    return 0` |

Algorithm 1 the PyTER Algorithm

---

Input: A buggy program $P$, test cases $\mathcal{T}_N$ and $\mathcal{T}_P$ tracebacks $\mathbf{T}$
Output: A correct program $P'$ satisfying all test cases in $\mathcal{T}_N \cup \mathcal{T}_P$ 1: function REPAIR( $P$, $\mathcal{T}_P$, $\mathcal{T}_N$, $\mathbf{T}$ )
2:     $C \leftarrow$ CandidateVariables( $\mathbf{T}$ )
3:     $\Upsilon \leftarrow$ TypeAnalysis( $P$, $C$, $\mathcal{T}_P$, $\mathcal{T}_N$, $\mathbf{T}$ )
4:     for $\delta \in$ FaultLocalization( $\mathbf{T}$, $\Upsilon$ ) do
5:       for $S_i^* \in$ PatchCandidates($\delta$) do
6:         $P' \leftarrow P[\, S_i \mapsto S_i^*\,]$      ▷ Apply the patch
7:         $\mathcal{T}_N' \leftarrow$ Execute( $P'$, $\mathcal{T}_P$, $\mathcal{T}_N$ )      ▷ $\mathcal{T}_N'$ : Failed tests
8:         if $\mathcal{T}_N' = \emptyset$ then
9:           return $P'$
10:        else if $\mathcal{T}_N' \subset \mathcal{T}_N$ then
11:          $P^* \leftarrow$ REPAIR( $P'$, $\mathcal{T}_P$, $\mathcal{T}_N'$, $\mathbf{T}$ )
12:          if $P^* \neq$ fail then
13:            return $P^*$
14:    return fail

FIG. 4

| | Program | #B | Avg. KLoC | NegTest Avg. Num | NegTest Avg. Time | PosTest Avg. Num | PosTest Avg. Time | Baseline #G | Baseline #C | Baseline Fix Rate | Baseline Prec | Baseline Avg. Time | PyTER #G | PyTER #C | PyTER Fix Rate | PyTER Prec | PyTER Avg. Time |
|---|---|---|---|---|---|---|---|---|---|---|---|---|---|---|---|---|---|
| TypeBugs | airflow | 7 | 73.9 | 1.0 | 53.4 | 13.3 | 43.9 | 3 | 0 | 0.0% | 0.0% | 232.0 | 4 | 3 | 42.9% | 75.0% | 50.5 |
| | beets | 1 | 21.4 | 1.0 | 4.0 | 9.0 | 7.0 | 1 | 0 | 0.0% | 0.0% | 8.1 | 1 | 0 | 0.0% | 0.0% | 3.6 |
| | core | 9 | 230.5 | 1.4 | 11.6 | 23.7 | 14.7 | 6 | 4 | 44.4% | 66.7% | 303.7 | 6 | 5 | 55.6% | 83.3% | 88.7 |
| | kivy | 1 | 44.5 | 1.0 | 6.0 | 4.0 | 26.0 | 1 | 0 | 0.0% | 0.0% | 400.57 | 1 | 0 | 0.0% | 0.0% | 54.3 |
| | luigi | 1 | 13.2 | 1.0 | 4.0 | 1.0 | 2.0 | 1 | 0 | 0.0% | 0.0% | 20.6 | 1 | 0 | 0.0% | 0.0% | 1.5 |
| | numpy | 3 | 53.4 | 2.0 | 6.0 | 72.3 | 4.7 | 1 | 0 | 0.0% | 0.0% | 1356.8 | 2 | 0 | 0.0% | 0.0% | 225.5 |
| | pandas | 45 | 86.9 | 7.0 | 42.6 | 141.11 | 125.8 | 21 | 11 | 24.4% | 52.4% | 1478.2 | 24 | 19 | 42.2% | 79.2% | 1063.4 |
| | rasa | 1 | 45.8 | 1.0 | 9.0 | 7.0 | 6.0 | 1 | 1 | 100.0% | 100.0% | 7.3 | 1 | 1 | 100.0% | 100.0% | 7.3 |
| | requests | 4 | 9.4 | 1.5 | 8.0 | 184.8 | 33.3 | 3 | 1 | 25.0% | 33.3% | 942.4 | 4 | 4 | 100.0% | 100.0% | 167.7 |
| | rich | 1 | 16.1 | 1.0 | 9.0 | 7.0 | 6.0 | 0 | 0 | 0.0% | n/a | 3600.0 | 0 | 0 | 0.0% | n/a | 3600.0 |
| | salt | 9 | 364.8 | 1.0 | 31.0 | 12.7 | 165.6 | 3 | 2 | 22.2% | 66.7% | 1265.5 | 6 | 6 | 66.7% | 100.0% | 93.8 |
| | sanic | 7 | 5.6 | 3.3 | 5.7 | 51.0 | 9.3 | 1 | 1 | 33.3% | 50.0% | 1406.6 | 3 | 3 | 100.0% | 100.0% | 43.5 |
| | scikit-learn | 5 | 63.5 | 1.0 | 8.0 | 75.8 | 13.2 | 3 | 2 | 40.0% | 66.7% | 1561.6 | 3 | 2 | 40.0% | 66.7% | 408.7 |
| | tornado | 1 | 12.6 | 1.0 | 8.0 | 171.0 | 20.0 | 1 | 1 | 100.0% | 100.0% | 1307.9 | 1 | 1 | 100.0% | 100.0% | 199.2 |
| | zappa | 2 | 4.1 | 1.0 | 7.0 | 46.5 | 748.5 | 1 | 0 | 0.0% | 0.0% | 1876.3 | 1 | 1 | 50.0% | 100.0% | 1663.9 |
| | Total | 93 | 112.7 | 4.1 | 30.7 | 91.9 | 101.2 | 47 | 23 | 24.7% | 48.9% | 1196.0 | 58 | 45 | 48.4% | 77.6% | 651.2 |
| BugsInPy | ansible | 1 | 126.5 | 1.0 | 21.0 | 30.0 | 13.0 | 0 | 0 | 0.0% | n/a | 3600.0 | 0 | 0 | 0.0% | n/a | 2549.7 |
| | fastapi | 2 | 7.4 | 1.0 | 5.5 | 7.0 | 3.0 | 0 | 0 | 0.0% | n/a | 10.8 | 0 | 0 | 0.0% | n/a | 1.5 |
| | keras | 45 | 26.5 | 1.0 | 23.8 | 14.8 | 50.4 | 21 | 0 | 0.0% | 0.0% | 2162.9 | 1 | 1 | 20.0% | 100.0% | 1769.8 |
| | luigi | 7 | 12.3 | 1.1 | 9.3 | 54.9 | 23.0 | 4 | 1 | 14.3% | 25.0% | 207.1 | 5 | 3 | 42.9% | 60.0% | 15.3 |
| | matplotlib | 1 | 94.9 | 1.0 | 8.0 | 214.0 | 41.0 | 0 | 0 | 0.0% | n/a | 0.0 | 0 | 0 | 0.0% | n/a | 0.0 |
| | pandas | 25 | 87.9 | 9.2 | 67.4 | 250.8 | 130.5 | 11 | 1 | 16.0% | 36.4% | 2040.3 | 13 | 7 | 28.0% | 53.8% | 1636.7 |
| | scrapy | 10 | 12.7 | 1.6 | 8.7 | 21.0 | 6.5 | 6 | 2 | 20.0% | 33.3% | 62.2 | 6 | 5 | 50.0% | 83.3% | 12.0 |
| | spacy | 1 | 78.6 | 1.0 | 7.0 | 6.0 | 7.0 | 1 | 0 | 0.0% | 0.0% | 9.7 | 1 | 0 | 0.0% | 0.0% | 79.8 |
| | tornado | 2 | 13.3 | 1.0 | 3.5 | 44.0 | 3.3 | 1 | 0 | 0.0% | n/a | 1.2 | 0 | 0 | 50.0% | 100.0% | 0.8 |
| | tqdm | 1 | 1.9 | 1.0 | 6.0 | 54.0 | 4.0 | 0 | 0 | 0.0% | n/a | 0.0 | 0 | 0 | 0.0% | n/a | 0.0 |
| | youtube-dl | 2 | 112.0 | 1.0 | 9.0 | 81.5 | 8.5 | 1 | 1 | 50.0% | 100.0% | 1815.2 | 1 | 1 | 50.0% | 100.0% | 1802.9 |
| | Total | 57 | 54.6 | 4.7 | 35.7 | 131.7 | 67.3 | 25 | 8 | 14.0% | 32.0% | 1196.0 | 28 | 18 | 31.6% | 64.3% | 968.5 |

_US 12,430,200 B2_

DEVICE AND METHOD FOR PROGRAM REPAIR FOR TYPE ERRORS IN DYNAMICALLY TYPED LANGUAGE

CROSS-REFERENCE TO RELATED APPLICATION(S)

This application claims the benefit under 35 USC § 119(a) of Korean Patent Application No. 10-2023-0033808 filed on Mar. 15, 2023 and Korean Patent Application No. 10-2023-0049394 filed on Apr. 14, 2023 in the Korean Intellectual Property Office, the entire disclosure of which is incorporated herein by reference for all purposes.

BACKGROUND

1. Field

The following description relates to automatic program repair (APR), and more particularly, to technology for automatically repairing a type error that is a serious issue in a dynamically typed language, such as Python).

2. Description of Related Art

Automatic program repair (APR) technology refers to technology that receives, as input, a buggy program and a statement that the corresponding program needs to satisfy and automatically repairs a bug such that the program satisfies the input statement. Currently, with a rapid increase in complexity of software, resources required in a debugging stage of finding and repairing a bug, that is, an error in a program. In particular, since the debugging stage entirely relies on a manual work, the debugging stage may consume a large amount of time and also be prone to mistakes. Therefore, the automatic program repair technology is employed as a solution to improve software productivity by automating a debugging process.

Traditional automatic error repair technology for a dynamically typed language refers to technology for education of students not a code used in the industry and targets a Python programming task or a code of students. As the popularity of Python increases, it has been increasingly adopted not only in the industry but also as a programming language for education. Therefore, as a study to provide feedback to students to improve the quality of education, technology for fixing incorrect answers of students to correct answers is proposed. However, since this technology targets a code of students, it is difficult to apply to Python code in the real-world industry. Also, this technology targets not only type errors but also all errors, so is not appropriate as technology specialized for type error repair.

In a dynamically typed language, a type is not fixed. Therefore, if an inappropriate type is used, a bug occurs in a program during run-time. To prevent such a bug, various type inference techniques for the dynamically typed language. The existing technology aims to finding an error by inferring all possible types. However, to which type a type that causes a type error needs to be changed, rather than all types, needs to be inferred to fix an error. Since the existing technology infers all possible types, which type is a correct type may not be known, which makes it difficult to attempt to repair a type error. Accordingly, the existing type inference in the dynamically typed language is not appropriate for automatically repairing a type error.

SUMMARY

A technical subject of at least one example embodiment is to provide a device and method for efficiently repairing a type error occurring in a dynamically typed language.

A method of automatically repairing a type error according to an example embodiment refers to a method of automatically repairing a type error occurring in a dynamically typed language, performed by a computing device including a processor and includes acquiring a buggy program, a testcase, and error information; collecting a candidate variable in which a type error occurs; inferring a negative type that is a type of the candidate variable observed from a negative testcase and a positive type that is a type of the candidate variable observed from a positive testcase; estimating a fault location at which the type error occurs; generating a patch; and generating a fixed program by applying the patch to the buggy program, and the collecting of the candidate variable includes selecting a variable included in the error information as the candidate variable.

The present invention relates to technology specialized for finding a type difference through a negative testcase and a positive testcase for a dynamically typed language (e.g., Python) and accelerating an automatic program repair process using corresponding information to repair a type error in a real-world dynamically typed language program. As a result, it is verified that the present invention works well in a real-world Python program and also experimentally verified that the present invention has sufficient scalability and precision for automatic type error repair.

The present invention is first technology specialized in repairing a type error in a dynamically typed language and, ultimately, is expected to provide an opportunity of proposing an automatic repair program available not only in Python, which is a target of the present invention, but also in other dynamically typed languages through utilization and expansion of the present invention.

BRIEF DESCRIPTION OF THE DRAWINGS

These and/or other aspects, features, and advantages of the disclosure will become apparent and more readily appreciated from the following description of example embodiments, taken in conjunction with the accompanying drawings of which:

FIG. 1 illustrates an example of a buggy program and a fixed program;

FIG. 2 illustrates templates and examples used for error repair;

FIG. 3 illustrates a final algorithm for automatic type error repair;

FIG. 4 illustrates performance comparison results between technology of applying the present invention and technology of applying existing repair technology.

DETAILED DESCRIPTION

Figure 5:
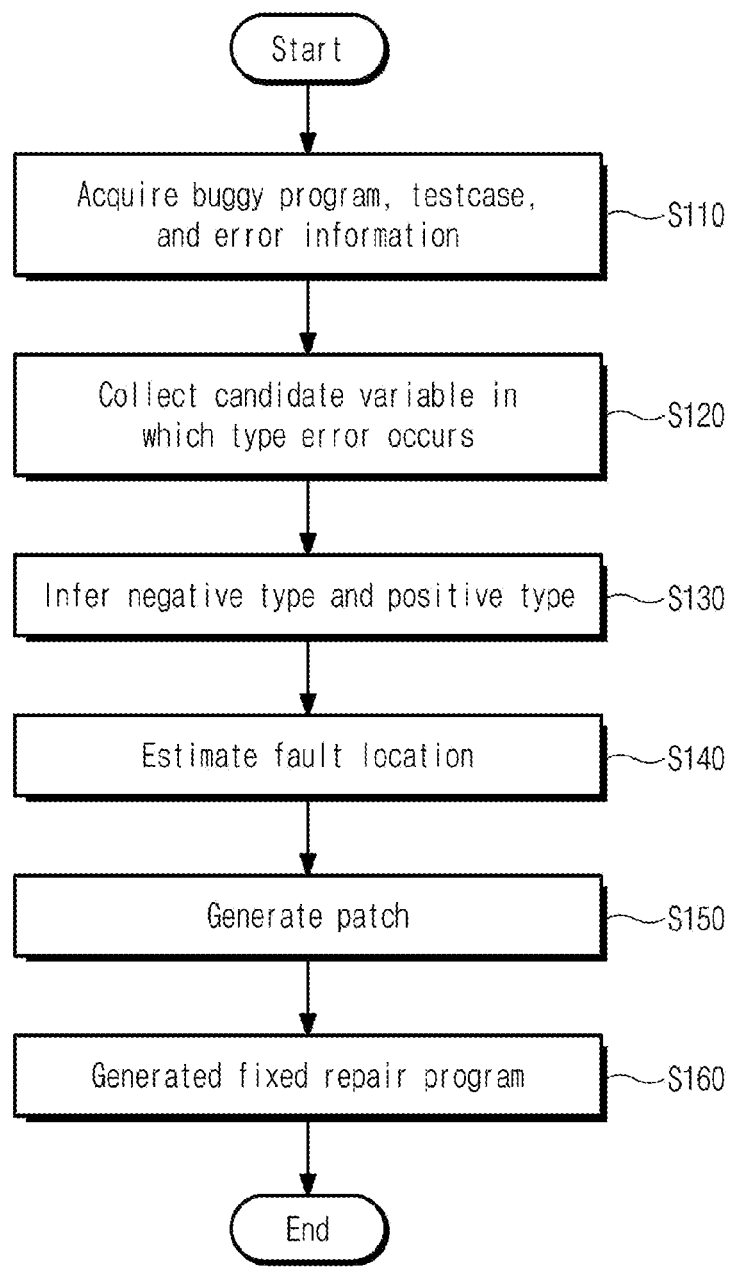
FIG. 5 is a flowchart illustrating a method of automatically repairing a type error according to an example embodiment.

Disclosed hereinafter are exemplary embodiments of the present invention. Particular structural or functional descriptions provided for the embodiments hereafter are intended merely to describe embodiments according to the concept of the present invention. The embodiments are not limited as to a particular embodiment.

Terms such as "first" and "second" may be used to describe various parts or elements, but the parts or elements should not be limited by the terms. The terms may be used to distinguish one element from another element. For instance, a first element may be designated as a second element, and vice versa, while not departing from the extent of rights according to the concepts of the present invention.

Unless otherwise clearly stated, when one element is described, for example, as being "connected" or "coupled" to another element, the elements should be construed as being directly or indirectly linked (i.e., there may be an intermediate element between the elements). Similar interpretation should apply to such relational terms as "between", "neighboring," and "adjacent to."

Terms used herein are used to describe a particular exemplary embodiment and should not be intended to limit the present invention. Unless otherwise clearly stated, a singular term denotes and includes a plurality. Terms such as "including" and "having" also should not limit the present invention to the features, numbers, steps, operations, subparts and elements, and combinations thereof, as described; others may exist, be added or modified. Existence and addition as to one or more of features, numbers, steps, etc. should not be precluded.

Unless otherwise clearly stated, all of the terms used herein, including scientific or technical terms, have meanings which are ordinarily understood by a person skilled in the art. Terms, which are found and defined in an ordinary dictionary, should be interpreted in accordance with their usage in the art. Unless otherwise clearly defined herein, the terms are not interpreted in an ideal or overly formal manner.

Example embodiments of the present invention are described with reference to the accompanying drawings. However, the scope of the claims is not limited to or restricted by the example embodiments. Like reference numerals proposed in the respective drawings refer to like elements.

The goal of the present invention is to receive a real-world program of a dynamically typed language (e.g., Python) and a type error occurring in the corresponding program as input and to automatically generate a program with the corresponding error repaired, that is, fixed, without human intervention. The following two tasks need to be solved in real-world automatic program repair issue.

Scalability: Technology efficiently operable on large software

Precision: Sophisticated technology capable of repairing most real-world type errors.

The present invention is to achieve a high level of scalability and precision by specializing in fixing a type error in a real-world program through differentiation from the existing technology for automatic program repair and automatic error repair in a dynamically typed language. The core of the present invention to achieve the aforementioned goal is to improve a speed and precision of an automatic error repair process using a type difference between a buggy execution and a normal execution of a program.

For example, an example shown in FIG. 1 is described. It is assumed that a total of three input values are given for a presented program, 1. main("0", 1, 1), 2. main(1, "0", 0), and 3. main(0, 0, 0). If three input values are given in a buggy program ((a) of FIG. 1), a type error (line 12) occurs in input values, 1. and 2., and input value, 3., is normally executed. Here, the input values, 1. and 2., are referred to as negative testcases and the input value, 3., is referred to as a positive testcase. The goal of this problem is to properly fix the buggy program such that all three input values are normally executed as in a fixed program shown in (b) of FIG. 1. To solve the corresponding problem, the present invention is to find a type difference by collecting types observed in each of the negative testcases and the positive testcase. For example, types of variables observed by entering the input value, 1., may be arranged as x: string, y: int, z: int, a: string, b: int, c: int, d: int. Table 2 shows types observed in all testcases. Here, a type observed in the negative testcase is referred to as a negative type and a type observed in the positive testcase as a positive type.

TABLE 1

|   | Negative types | Positive types | Difference | Ranking |
|---|---|---|---|---|
| x | {int, str} | {int} | {str} | 2 |
| y | {int, str} | {int} | {str} | 2 |
| z | {int} | {int} | ∅ | 3 |
| a | {str} | {int} | {str, int} | 1 |
| b | {int} | {int} | ∅ | 3 |
| c | {int} | {int} | ∅ | 3 |
| d | {int} | {int} | ∅ | 3 |

The negative types and the positive types may be organized as in Table 1 and a type difference can be seen in variables x, y, and a. In particular, in the case of the variable a, it can be said that the type difference is largest since the negative type and the positive type do not overlap at all (i.e., a common type is absent).

Using information on the type difference (e.g., information on a level of the type difference), a patch of preferentially converting a line related to the variable a and converting a type of the variable a from string to int in an automatic program statement process may be first attempted. After going through the aforementioned process, a patch, such as the fixed program shown in (b) of FIG. 1, is generated first and it can be said that this problem is effectively solved using the type difference.

1. Problem Definition

Programs

A core idea presented in the present invention is described based on a small language summarized as follows. If a grammar to be supported by each programming language is added to the small language, the core idea of the present invention may be applicable. A program P∈Pgm is a sequence of function declarations (P=$F_1,F_2, \ldots, F_n$). A function declaration F∈FDecl is a tuple (f,x,S) of a function name (f), a function parameter (x), and a body statement (S). In particular, an entry function that is a starting point of the program P is indicated as Fe.

$$S \to x = E | \text{return } E | S_1 : S_2$$

$$E \to n | s | b | x | E_1 \oplus E_2 \mid f(E_1, \ldots, E_n)$$

The statement S includes a parameter declaration statement (x=E), a return statement (return E), and a sequence of statements ($S_1;S_2$). The expression E includes an integer (n), a string (s), Boolean (b), a variable (x), a binary operation ($E_1 \oplus E_2$), and a function call (f($E_1, \ldots, E_n$)). For simplicity, it is assumed that all variables have different names and all functions explicitly return a value.

When a set of values is Val, that a program receives input and produces output is expressed as [[P]]: Val→Val. Here, [[P]] represents a partial function and [[P]]($v_i$)=⊥ is written when a function output value is not defined for input $v_i$. Here, ⊥ represents a special value that is not included in Val and it is assumed that $[[P]](v_i)$ outputs $\perp$ when it causes a type error. Also, for simple description, it is assumed that only a single type error is present in a single buggy program.

Problem Definition

It is assumed that program P and testcase $\tau \subseteq Val \times Val$ are given as problem input values in the present invention. Testcase $(v_i, v_o) \in \tau$ is expressed as a pair of an input value $(v_i)$ and an output value $(v_o)$. Some of given testcases should satisfy $[[P]](v_i)=\perp$. Here, a negative testcase is expressed as $\tau_N = \{(v_i, v_o) \in \tau \mid [[P]](v_i)=\perp\}$ and a positive testcase is expressed as $\tau_P = \{(v_i, v_o) \in \tau \mid [[P]](v_i)=v_o\}$. The goal of the present invention is to properly fix the given program P to produce P' that satisfies $\forall (v_i, v_o) \in \tau = \tau_N \cup \tau_P, [[P']](v_i)=v_o$.

2. Collecting Candidate Variables

Before fixing the program, variables to be used as candidates are defined. When a type error occurs, traceback T that traces error information is provided in Python and variables in T are candidates. In more detail, T provided from $[[[P]]](v_i)=\perp$ is indicated as traceback($[[P]](v_i)$). T includes a sequence of functions up to an error location and pairs of statements $(<(F_1,S_1),(F_2,S_2),\ldots,(F_n,S_n)>)$. Here, $F_1$ denotes entry function ($F_e$) and, for $1 \leq i \leq n-1$, $S_i$ denotes a statement that calls $F_{i+1}$. Also, $S_n$ denotes a statement that causes a type error. A set of T provided by executing a negative testcase is defined as T={traceback($[[P]](v_i))|(v_i,v_o) \in \tau_N\}$. Variables present in T are defined as $$Var(T) = \bigcup_{((f,x,\_) \in T)} Var(S) \cup \{x\}$$

and Var(S) denotes a set of variables used in the statement S. Also, variables defined as $$CandVars = \bigcup_{T \in \mathbb{T}} Var(T)$$

are defined as candidate variables and program repair is performed.

3. Inferring Negative and Positive Types

Inferring a negative type and a positive type to acquire a type difference that is the core of the present invention is described. The negative type is defined as $\forall \bar{x} \in$ Cand Vars, Neg Types $(\bar{x})=\{type(\bar{x},P,v_i)|(v_i,\_) \in \tau_N\}$ by observing types of candidate variables in negative testcase execution through dynamic analysis. Here, $type(x,P,v_i)$ denotes a type of the variable x when the program P is executed with the input value $v_i$. Likewise, the positive type is defined as Pos Types(x)=Pos Types$_{dynamic}(\bar{x}) \cup$ Pos Types$_{static}(\bar{x})$ using both dynamic analysis and static analysis. Here, Pos Types$_{dynamic}(x)$ and PosTypes$_{static}(x)$ denote a type inferred through the dynamic analysis and a type inferred through the static analysis, respectively. The former is defined as Pos Types$_{dynamic}(\bar{x})=\{type(\bar{x},P,v_i)|(v_P,\_) \in \tau T_P\}$ like the negative type. The latter refers to static analysis technology and uses type inference technology for type error repair in the present invention, rather than the existing type inference technology.

For type error repair, the goal is not to infer all types and it is important to infer an intended type in a normal execution. If an intended type of a variable matches a type observed from a negative testcase, the corresponding variable may be not a buggy variable. Otherwise, the corresponding variable may be a buggy variable that causes a type error and it may be known that the buggy variable needs to be changed with the intended type to repair the type error.

For maintenance, developers showed the tendency of maintaining types of variables as one despite being a dynamically typed language. The present invention defines technology called consistency-based type inference through the above observation results and discovers an intended type in a normal execution using the corresponding inference technology. The consistency-based type inference technology is performed as follows.

(1) When a variable x is a buggy variable, a type environment $\Lambda_{init} \bar{x}$:Cand Vars$\rightarrow 2^{Types}$ containing type information of variables is defined as follows:

$$\Lambda_{init}^x = \lambda y \in CandVars \begin{cases} \phi & \cdots y = x \\ NegTypes(x) & \cdots \text{otherwise} \end{cases}$$

(2) By running consistency-based type inference (denoted as infer) with the corresponding type environment, the intended type $\Upsilon \bar{x} \subseteq$ Types of the variable x is inferred as $\Upsilon \bar{x}$ =infer($\bar{x}, \Lambda_{init} \bar{x}$).

(3) Since the inference may not be deterministic, that is, $|\Upsilon \bar{x}|>1$, a positive type inferred through static analysis as Pos Types$_{static}(\bar{x})$=domType($\Upsilon \bar{x}$) using a function that outputs a dominant type, domType, is defined Consistency-Based Type Inference The present invention performs consistency-based type inference using a type environment to find out an intended type of a variable. It corresponds to the aforementioned process (2). To perform the consistency-based type inference, a set of type constraints is defined as follows:

$$C = \bigcup_{T \in \mathbb{T}} \bigcup_{((\_,\_,S),\_) \in T} \alpha(S)$$

Here, $\alpha$ denotes a function that extracts a type constraint from the statement S or the expression E and is defined as follows.

$$\alpha(S) = \begin{cases} \alpha(S_1) \cup \alpha(S_2) & \cdots S = S_1;S_2 \\ \alpha(E) \cup \{(x \doteq E)\} & \cdots S = x = E \\ \alpha(E) & \cdots S = \text{return } E \end{cases}$$

$$\alpha(E) = \begin{cases} \alpha(E_1) \cup \alpha(E_2) \cup \{(E_1 \doteq E_2)\} & \cdots E = E_1 \oplus E_2 \\ \bigcup_i \alpha(E_i) & \cdots E = f(E_1, \ldots, E_n) \\ \phi & \cdots \text{otherwise} \end{cases}$$

Here, $E_1 \doteq E_2$ represents a constraint that a type of $E_1$ and a type of $E_2$ should satisfy type consistency.

After generating C through the above process, final type environment $\Lambda$:Cand Vars$\rightarrow 2^{Types}$ is generated by solving the corresponding constraints as follows one by one.

$$\Phi_C(\Lambda) = \begin{cases} \Phi_{C'}(\phi(c, \Lambda)) & \cdots C = c \cup C' \\ \Lambda & \cdots C = \emptyset \end{cases}$$

Here, $\phi$ denotes a function that solves a single constraint $E_1 \doteq E_2$ and is defined as follows.

$$\phi((E_1 \doteq E_2), \Lambda) = \bigsqcup_{x_1 \in Var(E_1)} \Lambda[x^i \to \Lambda(x_1)] \cup \sigma_2] \sqcup \bigsqcup_{x_2 \in Var(E_2)} \Lambda[x^i \to \Lambda(x_2)] \cup \sigma_1]$$

Here, operator $\sqcup$ is defined as an operation of merging two maps. Also, $\sigma_1$ and $\sigma_2$ are defined as $\Lambda \vdash E_1 : \sigma_1$, $\Lambda \vdash E_2 : \sigma_2$, respectively, and types of $E_1$ and $E_2$ derived according to a rule defined in the type environment, and the rule defined in the type environment is as follows.

$$\overline{\Lambda \vdash n : \{int\}} \quad \overline{\Lambda \vdash s : \{str\}} \quad \overline{\Lambda \vdash b : \{bool\}} \quad \overline{\Lambda \vdash x : \Lambda(x)}$$

$$\frac{f \in CastFuncs}{\Lambda \vdash f(E) : \{f\}} \quad \frac{f \notin CastFuncs}{\Lambda \vdash f(E_1, \ldots, E_n) : \emptyset} \quad \frac{\Lambda \vdash E_1 : \sigma_1 \quad \Lambda \vdash E_2 : \sigma_2}{\Lambda \vdash E_1 \oplus E_2 : \sigma_1 \cup \sigma_2}$$

Here, CastFuncs is defined as a built-in type conversation function.

$$infer(x, \Lambda_{init}^x) = (fix_{\Lambda_{init}^x} \Phi_C)(x)$$

mentioned in process (2) of 3. may be defined using the functions defined as above. Here, $$fix_{\Lambda_{init}^x} \Phi_C$$

refers to a fixed-point algorithm of $\Lambda$ and is defined as follows.

$$\Lambda_0^x = \Lambda_{init}^x$$
$$\Lambda_i^x = \Phi_C(\Lambda_{i-1}^x) \ (i \geq 1)$$

This process may be arranged as a process of inferring the intended type of x in a correct execution with assuming that variables are positive except for the variable x assumed to be buggy.

Finding Dominant Type

After performing the aforementioned consistency-based type inference, a set of intended types of buggy variable is acquired. According to the observed results, a type most used by developers, that is, a dominant type is present among the intended types of the buggy variable. Since the dominant type can be said to be a type that is commonly used within a code, the corresponding variable can also be said to be a type used in a general situation. Therefore, using the dominant type among the intended types is very helpful in repairing a type error.

To find the dominant type, information $\Omega$:Cand Vars× Types→N including information on which variable type is used and the number of times the corresponding variable type is used during the consistency-based type inference process is maintained. Here, whenever the type environment $\Lambda$ is updated while performing the consistency-based type inference, $\Omega$ is updated as follows.

$$\bigsqcup_{\tau \in \sigma_1} \Omega[(x_1, \tau) \mapsto \Omega(x_1, \tau) + 1)] \bigsqcup \bigsqcup_{\tau \in \sigma_1} \Omega[(x_2, \tau) \mapsto (x_2, \tau) + 1]$$

Here, $\Omega(x, \tau)$ is initialized to 0 for all variables $x \in$ CandVars and all types $\tau \in$ Types. When $\Omega x$ is information generated when $\Lambda x$ is computed, domTypes in the positive type inference process (3) is defined as $$dom\ Types(\Upsilon^x) = argmax_{\tau \in \Upsilon^t} \Omega^t(x, \tau).$$

4. Type-Aware Fault Localization

Fault localization technology using NegTypes,PosTypes: CandVars→$2^{Types}$ acquired in the foregoing 3. is defined.

Function-Level Fault Localization

What is different from the existing fault localization technology is that fault localization is first performed on a function level. The present invention scores a type difference and performs the function-level fault localization. The type difference score of the variable x may be computed as follows.

$$score(x) = \left( \sum_{(\tau_1, \tau_2) \in A(x)} -1_{\tau_1 = \tau_2}, \sum_{(\tau_1, \tau_2) \in A(x)} 1_{\tau_1 = \tau_2} \right)$$

Here, A(x) denotes the cartesian product of NegTypes(x) and PosTypes(x). In the type difference score, score(x), the first and second elements measure how similar and different, the inferred NegTypes(x) and PosTypes(x), are, respectively. The higher the score, it may be a suspicious variable as a type error cause. Therefore, the most suspicious variable is defined as $\hat{x}$ =argmax$_{z, 60\ \hat{\epsilon}\ CandVars}$score($\hat{x}$') and lexicographic total order, (a,b)>(a',b')⇔a>a'∨(a=a'∧b>b'), is used.

Line-Level Fault Localization

Once the suspicious function F is selected in a previous process, spectrum-based fault localization (SBFL) that is the existing fault localization is performed in the corresponding F as follows.

$$score_F(l) = \begin{cases} 1 & \exists T \in T \cdot (F, S_i) \in T \\ \dfrac{failed(S_l)}{failed(S_l) + passed(S_l)} & otherwise \end{cases}$$

Here, failed($S_1$) and passed($S_1$) denote the number of times the statement S present in line 1 is executed in a negative testcase and the number of times the statement S is executed in a positive testcase, respectively. As a special note, in the case of the statement S present in the traceback T, the score is unusually set to 1.

5. Type-Aware Patch Generation

Patch generation using type information is described. It is assumed that $\delta$=(F,1, x,NegTypes(x),PosTypes(x)) is acquired through all the processes of 3. and 4. A patch is generated in statement $S_1$ present at line 1 through the following process.

Repair Template

Templates used in the present invention are shown in FIG. 2. The repair template includes a total of three main categories and nine sub-categories. Each main category template is introduced as follows.

TypeCasting: Template that inserts a statement that converts a type of suspicious variable x to a positive type.

Handling: Template that inspects a type of suspicious variable x and inserts a statement that executes a specific statement.

Guard: Template that inspects a type of suspicious variable x and inserts an expression that stops execution of a specific statement.

Here, a template contains holes ($\square$) of five types. Here, $\square_N$ represents a negative type included in NegTypes(x), $\square_P$ represents a positive type included in Pos Types(x), $\square_C$ represents a casting expression, $\square_S$ represents a statement, and $\square_E$ represents an expression.

Prioritizing Templates

Prioritizing templates is performed through two processes.

First, a main category template is first determined. If $S_1$ is a conditional statement, the Guard template is selected. Otherwise, |PosTypes(x)| is determined. If |PosTypes(x)|=1, the TypeCasting template is selected. Otherwise, main category templates are sequentially selected.

Second, a sub-category template is selected. If |NegTypes (x)|=1, a sub-category template with a name including "Negative" is preferentially selected and otherwise, sub-category templates are sequentially selected.

Template Instantiation

It is assumed that, in the previous process, a template statement $S^\square$ is generated in which a template to be applied to $S_1$ is selected and applied. A patch is completed by synthesizing holes $\square$ in the template through template instantiation that is a last stage. The synthesis process is performed through the following transition system.

$$(\Theta, \sim, \theta_I, \Theta_F)$$

Here, they denote a set of states, a transition relation, an initial state, and a final state, respectively. Here, a state $\theta \in \Theta$ is defined as ($S^\square$, $\delta$). The goal of template instantiation is to gradually synthesize them starting from ($S_i^\square$, $\delta$) that is the initial state $\theta_I \in \Theta_I$ and to generate the final state $(S^*_1, \_) \in \Theta_F$ that ultimately satisfies the following equation.

$$\forall (v_i, v_o) \in \bar{T}, [[P[S_i \mapsto S^*_1]]](v_i) = v_o$$

The transition relation is defined as follows.

$$\frac{\tau \in PosTypes(x)}{\square_S \sim x = dv_\tau} \quad \frac{\tau \in ReturnTypes(P)}{\square_S \sim \text{return } dv_\tau} \quad \frac{E \in ReturnExps(F)}{\square_S \sim \text{return } E}$$

$$\frac{\tau \in PosTypes(x)}{\square_E \sim dv_\tau} \quad \frac{PosTypes(x)\{\tau_1, \tau_2, \ldots, \tau_n\}}{\square_P \sim \{\tau_1, \tau_2, \ldots, \tau_n\}} \quad \frac{\tau \in NegTypes(x)}{\square_N \sim \tau}$$

$$\frac{\tau \in PosTypes(x)}{\square_C \sim \tau(x)} \quad \frac{\forall_{i \in (1,\ldots n)} E_i \sim E'_i}{f(E_1, \ldots, E_n) \sim f(E'_1, \ldots, E'_n)}$$

$$\frac{E_1 \sim E'_1 \; E_2 \sim E'_2}{E_1 \oplus E_2 \sim E'_1 \oplus E'_2} \quad \frac{E \sim E'}{x = E \sim x = E'} \quad \frac{E \sim E'}{\text{return } E \sim \text{return } E'} \quad \frac{S_1 \sim S'_1 \; S_2 \sim S'_2}{S_1; S_2 \sim S'_1; S'_2}$$

Here, $dv_\tau$ denotes a default value of type $\tau$ (e.g., $dv_{int}=0$). Also, ReturnExps(F) and ReturnTypes(F) denote a return expression and a return type, respectively, and are defined as follows.

$$ReturnExps(F) = \{E \mid \text{return } E \in ReturnStmts(F)\}$$

$$ReturnTypes(F) = \{\tau \in \sigma \mid E \in ReturnExps(F), PosTypes \vdash E : \sigma\}$$

Here, ReturnStmts(F) denotes a set of all return statements in function F.

6. Final Algorithm

FIG. 3 illustrates a final algorithm of automatic type error repair using all elements. Candidate variables are first collected from traceback set T (line 2) and dynamic analysis and static analysis are performed based on the collected candidate variables (line 3). Using the acquired traceback set T and type analysis results $\Upsilon$, type-aware fault localization is executed (line 4). Using $\delta$ acquired with the fault localization, type-aware patch generation is performed (line 5). When $S^*_1$ is acquired by completing the type-aware patch generation, the fixed program P' is generated by applying the same to the existing program P (line 6). If there is no failed testcase when executing a testcase (line 7), the fixed program P' is returned (lines 8 and 9), and otherwise, a patch is performed once more based on the fixed program and a final program P* is returned (lines 10 to 13). If there is no program that succeeds in all testcases even after performing the patch, fail is returned (line 14).

7. Evaluation

Performance of automatic repair technology for real-world Python program type error implemented by the present invention (also referred to as PyTER) is evaluated.

Benchmarks

Two benchmark sets were used for the experiments, for example, TypeBugs that is a benchmark of collecting real-world Python program type errors, provided by the present invention, and BugsInPy of collecting all errors in a real-world Python program. Here, since BugsInPy collected all errors, only tests with type errors were evaluated. TypeBugs includes a total of 15 open-source projects and 93 bugs and BugsInPy includes a total of 11 open-source projects and 57 bugs.

Setup

The experiments were performed on an Ubuntu 18.04 environment using 2 CPUs and 128 GB memory powered by the Intel Zeon Silver 4214 processor. In terms of selecting tools for comparative analysis, since there is no real-world Python program repair technology, Baseline that implemented the core of the existing repair technology was compared. When evaluating the benchmarks, the number of testcases and time executed during dynamic analysis were described and the benchmarks were evaluated by attempting error repair for up to 1 hour. The results generated by each system were verified through manual validation to verify whether a correct patch was actually generated Results A table of FIG. 4 sequentially includes a target benchmark and program (Program), the number of bugs (#B) and the average number of program codes (Avg. KLoc), the average number (Avg. Num) and average running time (Avg. Time) of negative testcases (NegTest) and positive testcases (PosTest), and performance evaluation of Baseline and PyTER. The evaluation of each of the tools includes a total number of plausible patches (#G) and the number of correct patches (#C), and accordingly, a fix rate (Fix Rate), precision (Prec), and average patch generation time (Avg. Time) are presented. When applying the core of the existing repair technology, TypeBugs showed a fix rate of 24.7% and an average patch generation time of 1196 seconds, and BugsInPy showed a fix rate of 14.0% and an average patch generation time of 1248.4 seconds. On the contrary, when applying the core of the present invention, TypeBugs achieved a fix rate of 48.4% and an average patch generation time of 651.2 seconds and BugsInPy achieved a fix rate of 31.6% and an average patch generation time of 968.5 seconds. Accordingly, that the scalability and the precision, which are the goals of automatic error repair technology, were sufficiently achieved is experimentally shown.

FIG. 5 is a flowchart illustrating a method of automatically repairing a type error (hereinafter, an automatic repair method) according to an example embodiment. In describing the automatic repair method, detailed description of contents that overlap the aforementioned description will be omitted.

The automatic repair method may be performed by a computing device that includes at least a processor and/or memory. That is, at least some of operations included in the automatic repair method may be understood as an operation of the processor included in the computing device. The computing device may include a personal computer (PC), a server, a tablet PC, and a laptop computer, and may also be referred to as an automatic type error repair device.

In operation S110, a buggy program, a testcase, and error information are acquired. The buggy program in which a type error is present (or a buggy program in which a type error occurs), the testcase, and the error information may be received through a predetermined wired/wireless communication network, or may be received from a storage device, such as a USB memory device, through a predetermined I/O interface. Depending on example embodiment, the buggy program, the testcase, and the error information may be pre-stored in the computing device. As another example, the error information may be acquired through an error information trace function (traceback) of Python. Also, the testcase may include a positive testcase in which a type error does not occur and a negative testcase in which a type error occurs.

In operation S120, a candidate variable in which a type error occurs may be collected. A variable included in the error information may be designated as the candidate variable.

In operation S130, the negative type and the positive type for the candidate variable are inferred. The negative type represents a type observed from a negative testcase and the positive type represents a type observed from a positive testcase. To infer an intended type for the candidate variable, consistency-based inference and/do finding a dominant type may be performed.

In operation S140, a type-aware fault localization operation is performed. A fault location may be estimated through function-level fault localization and/or line-level fault localization.

In operation S150, a type-aware patch generation is performed. A patch may be generated using a predetermined repair template. Here, a main category and a sub-category may be selected according to a template priority and the patch may be generated according to template instantiation.

In operation S160, a fixed program in which an error is repaired, that is fixed is generated by applying the generated patch to the buggy program. If there is no failed case when running a testcase for the fixed program, the generated fixed program may be selected as a final program. However, if there is a failed case, the final program may be generated by performing a patch generation process again based on the fixed program. If there is no program that succeeds in all testcases even after the patch generation process is performed a predetermined number of times, a corresponding protocol process may be suspended.

The aforementioned method according to example embodiments may be implemented in a form of a program executable by a computer apparatus. Here, the program may include, alone or in combination, a program instruction, a data file, and a data structure. The program may be specially designed to implement the aforementioned method or may be implemented using various types of functions or definitions known to those skilled in the computer software art and thereby available. Also, here, the computer apparatus may be implemented by including a processor or a memory that enables a function of the program and, if necessary, may further include a communication apparatus.

The program for implementing the aforementioned method may be recorded in computer-readable record media. The media may include, for example, a semiconductor storage device such as an SSD, ROM, RAM, and a flash memory, magnetic disk storage media such as a hard disk and a floppy disk, optical record media such as disc storage media, a CD, and a DVD, magneto optical record media such as a floptical disk, and at least one type of physical device capable of storing a specific program executed according to a call of a computer such as a magnetic tape.

Although some example embodiments of an apparatus and method are described, the apparatus and method are not limited to the aforementioned example embodiments. Various apparatuses or methods implementable in such a manner that one of ordinary skill in the art makes modifications and alterations based on the aforementioned example embodiments may be an example of the aforementioned apparatus and method. For example, although the aforementioned techniques are performed in order different from that of the described methods and/or components such as the described system, architecture, device, or circuit may be connected or combined to be different form the above-described methods, or may be replaced or supplemented by other components or their equivalents, it still may be an example embodiment of the apparatus and method.

The device described above can be implemented as hardware elements, software elements, and/or a combination of hardware elements and software elements. For example, the device and elements described with reference to the embodiments above can be implemented by using one or more general-purpose computer or designated computer, examples of which include a processor, a controller, an ALU (arithmetic logic unit), a digital signal processor, a microcomputer, an FPGA (field programmable gate array), a PLU (programmable logic unit), a microprocessor, and any other device capable of executing and responding to instructions. A processing device can be used to execute an operating system (OS) and one or more software applications that operate on the said operating system. Also, the processing device can access, store, manipulate, process, and generate data in response to the execution of software. Although there are instances in which the description refers to a single processing device for the sake of easier understanding, it should be obvious to the person having ordinary skill in the relevant field of art that the processing device can include a multiple number of processing elements and/or multiple types of processing elements. In certain examples, a processing device can include a multiple number of processors or a single processor and a controller. Other processing configurations are also possible, such as parallel processors and the like.

The software can include a computer program, code, instructions, or a combination of one or more of the above and can configure a processing device or instruct a processing device in an independent or collective manner. The software and/or data can be tangibly embodied permanently or temporarily as a certain type of machine, component, physical equipment, virtual equipment, computer storage medium or device, or a transmitted signal wave, to be interpreted by a processing device or to provide instructions or data to a processing device. The software can be distributed over a computer system that is connected via a network, to be stored or executed in a distributed manner. The software and data can be stored in one or more computer-readable recorded medium.

A method according to an embodiment of the invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc., specially designed to store and execute program instructions. Examples of the program instructions may include not only machine language codes produced by a compiler but also high-level language codes that can be executed by a computer through the use of an interpreter, etc. The hardware mentioned above can be made to operate as one or more software modules that perform the actions of the embodiments of the invention and vice versa.

While the present invention is described above referencing a limited number of embodiments and drawings, those having ordinary skill in the relevant field of art would understand that various modifications and alterations can be derived from the descriptions set forth above. For example, similarly adequate results can be achieved even if the techniques described above are performed in an order different from that disclosed, and/or if the elements of the system, structure, device, circuit, etc., are coupled or combined in a form different from that disclosed or are replaced or substituted by other elements or equivalents. Therefore, various other implementations, various other embodiments, and equivalents of the invention disclosed in the claims are encompassed by the scope of claims set forth below.

What is claimed is:

1. A method of automatically repairing a type error occurring in a dynamically typed language, performed by a computing device comprising a processor, the method comprising:

acquiring a buggy program, a testcase, and error information;

collecting a candidate variable in which the type error occurs;

inferring a negative type that is a type of the candidate variable observed from a negative testcase and a positive type that is a type of the candidate variable observed from a positive testcase;

estimating a fault location at which the type error occurs;

generating a patch; and generating a fixed program by applying the patch to the buggy program, wherein the collecting of the candidate variable comprises selecting a variable included in the error information as the candidate variable.

2. The method of claim 1, wherein the inferring comprises inferring the negative type through dynamic analysis for the buggy program and inferring the positive type through dynamic analysis and static analysis for the buggy program.

3. The method of claim 2, wherein the estimating of the fault location comprises estimating, as the fault location, a function that includes a candidate variable with a largest degree of difference between the negative type and the positive type among candidate variables.

4. The method of claim 3, wherein the degree of difference is determined based on type difference score (score (x)) defined as the following equation:

$$\text{score}(x) = \left( \sum_{(\tau_1,\tau_2) \in A(x)} -1_{\tau_1=\tau_2}, \sum_{(\tau_1,\tau_2) \in A(x)} 1_{\tau_1=\tau_2} \right)$$

where $A(x)$ denotes a cartesian product of a negative type and a positive type of a candidate variable x, $\tau_1$ denotes a single type between types, and $\tau_2$ denotes another type between the types.

5. The method of claim 4, wherein the generating of the patch comprises generating a template statement that includes holes using a predetermined template.

6. The method of claim 5, wherein the generating of the patch comprises generating the patch by synthesizing the holes through a transition system.

7. The method of claim 6, wherein the generating of the fixed program comprises generating the fixed program by performing Algorithm 1:

---
[Algorithm 1]
Algorithm 1 The P$_y$TER Algorithm
---

```
Input: A buggy program P, test cases 𝒯_N and 𝒯_P, tracebacks 𝕋
Output: A correct program P' satisfying all test cases in 𝒯_N ∪ 𝒯_P
 1:   function REPAIR(P, 𝒯_P, 𝒯_N, 𝕋)
 2:     C ← CandidateVariables(𝕋)
 3:     T ← TypeAnalysis (P, C, 𝒯_P, 𝒯_N, 𝕋)
 4:     for δ ∈ FaultLocalization (𝕋, T) do
 5:       for S_i* ∈ PatchCandidates(δ) do
 6:         P' ← P[S_i ↔ S_i*]              ▸ Apply the patch
 7:         𝒯'_N ← Execute(P', 𝒯_P, 𝒯_N)    ▸ 𝒯'_N: Failed tests
 8:         if 𝒯'_N = ∅ then
 9:           return P'
10:         else if 𝒯'_N ⊂ 𝒯_N then
11:           P* ← REPAIR(P', 𝒯_P, 𝒯'_N, 𝕋)
12:           if P* ≠ fail then
13:             return P*
14:   return fail.
```

* * * * *